United States Patent [19]

Hara et al.

[11] 4,141,266
[45] Feb. 27, 1979

[54] DRUM TYPE FLYING SHEARS

[75] Inventors: Tsutomu Hara; Bunpei Masuda, both of Yokohama, Japan

[73] Assignee: Ishikawajima-Harima Jukogyo Kabushiki Kaisha, Ote, Japan

[21] Appl. No.: 791,049

[22] Filed: Apr. 26, 1977

[30] Foreign Application Priority Data

Apr. 28, 1976 [JP] Japan ................................. 51-49586
Apr. 28, 1976 [JP] Japan ................................. 51-49587
Apr. 28, 1976 [JP] Japan ................................. 51-49589
Sep. 14, 1976 [JP] Japan ................................ 51-110182

[51] Int. Cl.² ........................................... B23D 25/12
[52] U.S. Cl. .......................................... 83/337; 83/37; 83/528

[58] Field of Search ................... 83/37, 337, 528, 344, 83/305

[56] References Cited

U.S. PATENT DOCUMENTS 3,670,609 6/1972 Contalido ............................... 83/37
4,058,041 11/1977 Ito ........................................ 83/337

Primary Examiner—Donald R. Schran
Attorney, Agent, or Firm—Scrivener, Parker, Scrivener & Clarke

[57] ABSTRACT

Disclosed is a drum type flying shear wherein both or either of blades carried by upper and lower drums, respectively, is caused to describe a part of a non-circular locus whose major axis extends vertically when a blank or hot strip is almost sheared off.

1 Claim, 12 Drawing Figures

DRUM TYPE FLYING SHEARS

DETAILED DESCRIPTION OF THE INVENTION

In a hot rolling line, the leading and trailing edges of a hot strip rolled by a rough rolling mill are sheared by a drum type flying shear prior to the further rolling by a finishing rolling stand.

In general in the prior art drum type flying shears a blade draws a circular locus and in order to completely cut off a hot strip the degree of lapping of a pair of blades must be increased. However since the blades draw circular loci, the gap or clearance between the blades must be increased when the degree of lapping in increased. In order to completely shear a crop from a hot strip which becomes a product needleshaped burrs tend to be formed on the strip. This defect will be described in more detail with reference to FIG. 12.

In FIG. 12 there are shown steps of cutting a crop from a strip S with an upper blade a and a lower blade b. After shearing a burr c is left on the strip S and is ironed or rolled again between the upper and lower blades a and b into a needle-shaped burr d. When the strip S is rolled again by the finishing rolling stand, the needle-shaped burr d is forced out of the strip S by work rolls and adheres to them. As a result, the needle-shaped burrs not only scratch the surfaces of the strip S but also cause the surface flaws of the work rolls. In addition with the increase in degree of lapping, the gap is also increased so that partial or incomplete shearing tends to occur very often. Recently in order to save the energy, the slap heating temperature is decreased so that the thickness of a hot strip is increased to 80 mm from the former thickness of about 40 mm. In order to shear the hot strip with the thickness of 80 mm, both the degree of lapping and the gap must be increased so that the needle-shaped burrs tend to be produced more and more and incomplete shearing occurs more often.

In view of the above, one of the objects of the present invention is to provide a drum type flying shear which may not only attain complete shearing but also prevent the formation of needle-shaped burrs whereby the qualities of the hot strips may be improved and the surface flaws of work rolls may be prevented.

The present invention will become more apparent from the following description of some preferred embodiments thereof taken in conjunction with the accompanying drawings, in which.

Figure 1:
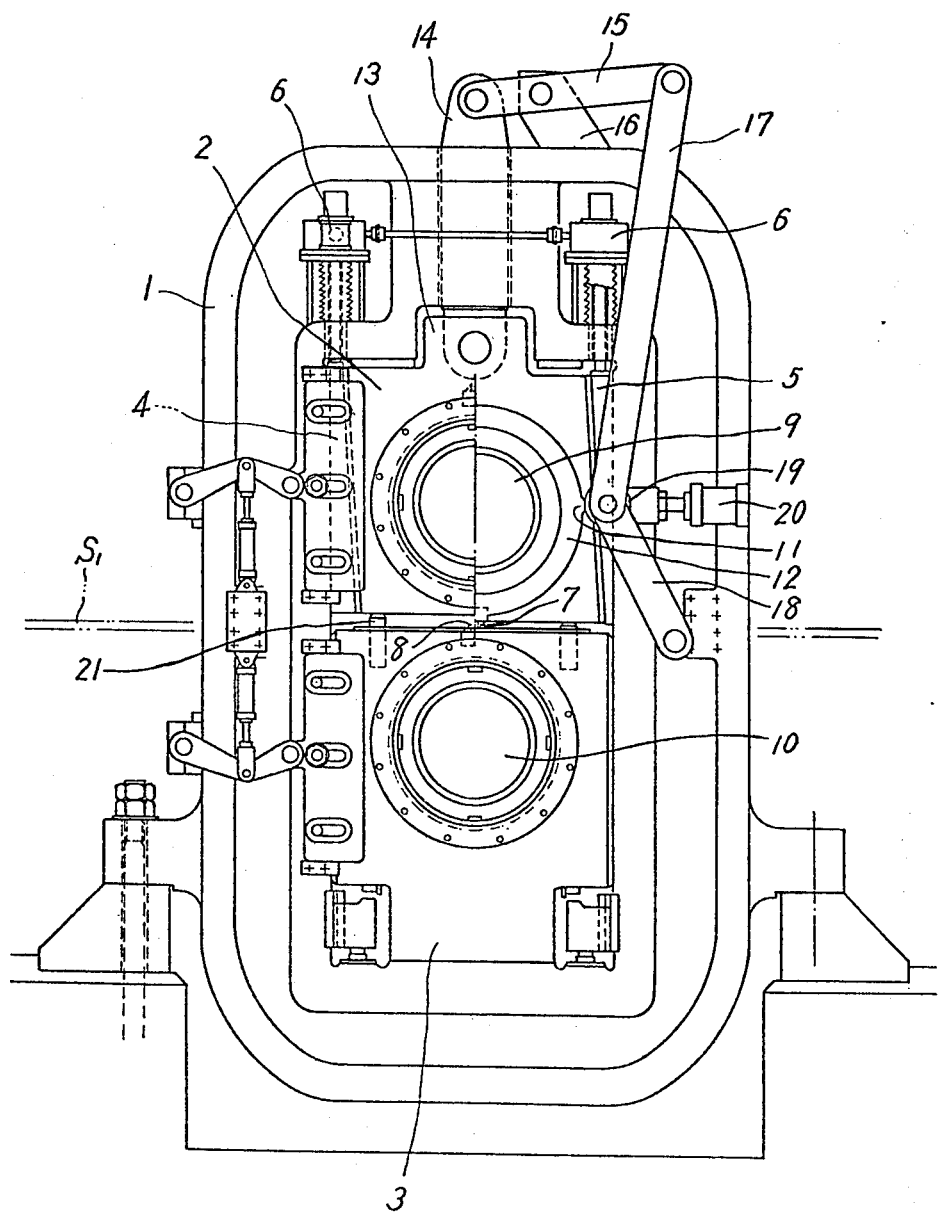
FIG. 1 is a front view of a first embodiment of a drum type flying shear in accordance with the present invention.
Figure 2:
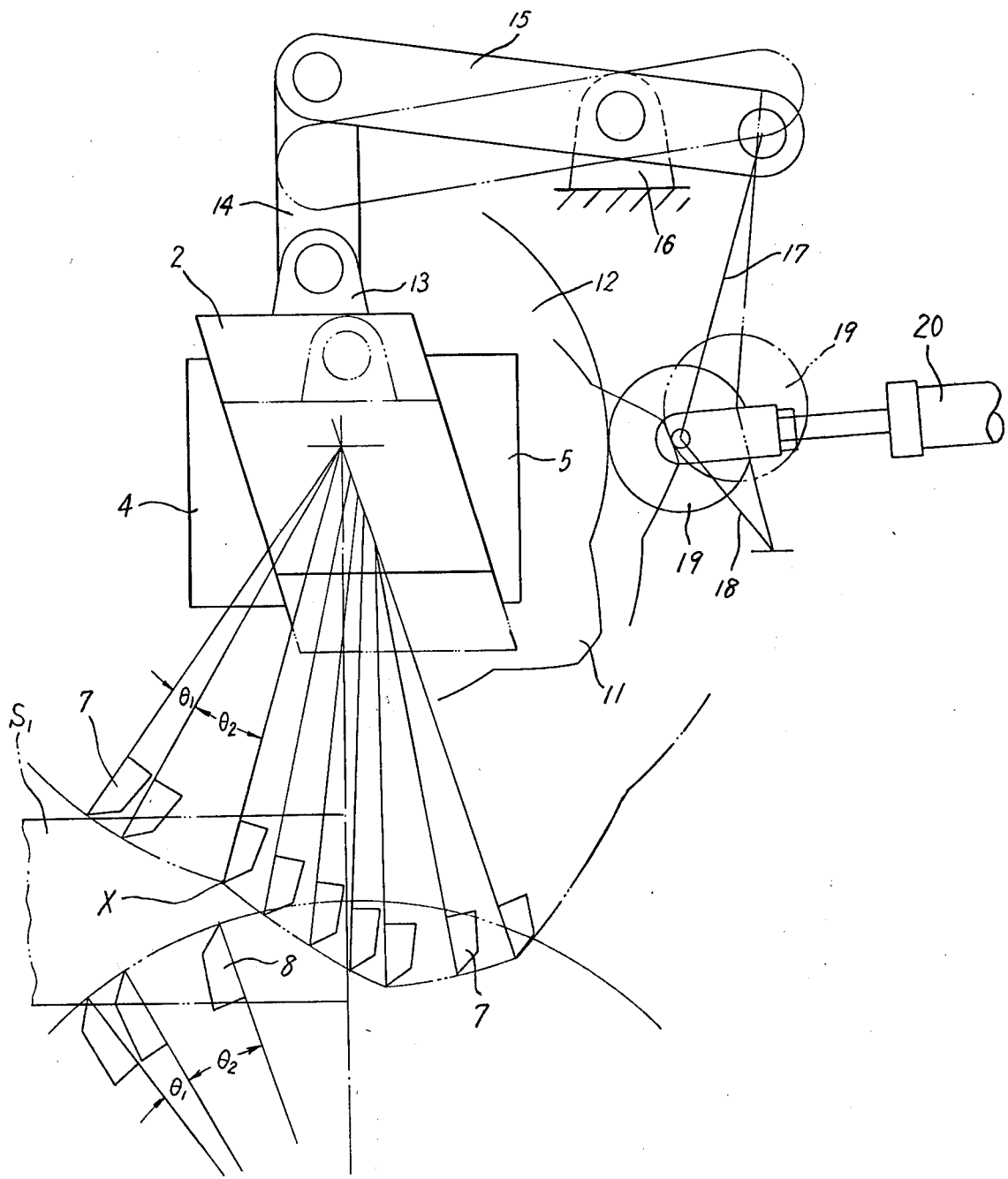
FIG. 2 is a view used for the explanation of the mode of operation thereof.

First Embodiment, FIGS. 1 and 2

Referring to FIG. 1, a pair of housings or frames 1 are erected on both sides of a hot strip $S_1$, respectively, and are spaced apart from the hot strip $S_1$ so that the latter may pass between the housings 1. A lower bearing box 3 having a bearing (not shown) is vertically movably mounted on the lower portion of the housing 1. Taper wedges 4 and 5 are mounted on guide surfaces formed on the upper inner side of the housing 1 and are vertically movable by driving devices 6, and an upper bearing box 2 having a bearing (not shown) is mounted on the tapered wedges 4 and 5 in such a way that the bearing box 3 may be vertically moved along the tapered surfaces of the wedges 4 and 5.

An upper drum 9 having an upper blade 7 is rotatably supported by the upper bearing boxes 2 and a lower drum 10 having a lower blade 8 is supported by the lower bearing boxes 3 so that the upper and lower blades 7 and 8 may coact to shear the hot strip $S_1$. As best shown in FIG. 1, a cam plate 12 with a projection 11 extended from the periphery of the cam plate 12 is carried by the shaft of the upper drum 9 for rotation in unison therewith and in such a way that the projection 11 may be located at the lowermost position when the rotation of the upper drum 9 is initiated.

Still referring to FIG. 2, the lower end of a link 14 is pivoted to a bracket 13 firmly attached to the top of the upper bearing box 2 while the upper end of the link 14 is extended upwardly through a hole formed through the top of the housing 1 and is pivoted to one end of a lever 15 pivoted to a bracket 16 attached to the housing 1. The other end of the lever 15 is pivoted to the upper end of a link 17 of a toggle mechanism which extends downwardly at an angle to the vertical, and the lower end of the link 17 is pivoted to one end of a link 18 of the toggle mechanism whose the other end is pivoted to the side wall of the housing 1. A guide roller or cam follower 19 is rotatably carried by a pin pivoting the lower end of the link 17 to the upper end of the link 18 and is normally pressed against the periphery of the cam plate 12. The free end of a rod of a hydraulic cylinder 20 mounted on the side wall of the housing 1 is also pivoted to the lower end of the link 17 and the upper end of the link 18.

Referring back to FIG. 1, a balance cylinder 21 is mounted on the lower bearing box 3 for lifting it, and the upper and lower drums 9 and 10 are drivingly coupled through upper and lower spindles (not shown) to a driving device (not shown).

Next the mode of operation of the first embodiment with the above construction will be described. When the hot strip $S_1$ is fed into the drum type flying shear and reaches a predetermined position, a sensor (not shown) outputs a signal in response to which the driving device is energized to drive the upper and lower drums 9 and 10.

Upon rotation of the upper and lower drums 9 and 10, the upper and lower blades 7 and 8 draw arcuate loci and start shearing of the hot strip $S_1$. The cam plate 12 carried by the upper drum 9 also rotates in unison with the latter. The guide roller 19 which is pressed against the cam plate is also caused to rotate and the links 14, the lever 15 and the links 17 and 18 of the toggle mechanism remain in their positions indicated by the solid lines in FIG. 2.

The upper and lower blades 7 and 8 rotate through an angle $\theta_1$ and then through an angle $\theta_2$, drawing the arcuate loci and shearing the hot strip $S_1$ (See FIG. 2). When the cutting edge of the upper blade 7 reaches a point X the projection 11 of the cam plate 12 is made into contact with the guide roller 19 so that the links 17 and 18 are caused to swing to the right in FIG. 2 and the rod of the hydraulic cylinder 20 is forced to be withdrawn into the cylinder as indicated by the two-dot chain lines. Consequently the upper link 17 is caused to lift, causing the lever 15 to swing in the counterclockwise direction so that the upper bearing box 2 is forced to move downwardly. Since the upper bearing box 2 is fitted between the tapered surfaces of the wedges 4 and 5, it is caused to slide on them at an angle to the vertical; that is, in the direction in which the upper blade 7 may be overlap with the lower blade 8 to a large extent. As a consequence the upper blade 7 is forced downward, drawing a non-circular path as indicated by the two-dot chain lines in FIG. 2, whereby the hot strip $S_1$ can be completely sheared.

The hydraulic cylinder 20 is so operated that the guide roller 19 may be always made into physical contact with the cam plate 12. Therefore when the guide roller 19 passes past the projection 11 of the cam plate 12, it is extended toward the left from the position indicated by the two-dot chain lines so that the upper and lower links 17 and 18 are forced to swing to the left and consequently the lever 15 is forced to rotate in the clockwise direction. As a result, the upper bearing box 2 is caused to move upwardly along the tapered surfaces of the wedges 4 and 5 to the initial position and the upper blade 7 moves again along the circular path. On the other hand, the lower blade 8 always passes the circular path. Since the position of the upper bearing box 2 is precisely controlled by the cam plate 12, the cam follower 19, the toggle mechanism consisting of the hydraulic cylinder 20 and the upper and lower links 17 and 18 and the lever mechanism consisting of the lever 15 and the link 14, the deviation of timing for coacting the upper and lower blades 7 and 8 for shearing the hot strip $S_1$ will not occur so that the complete sharing may be ensured.

Figure 11:
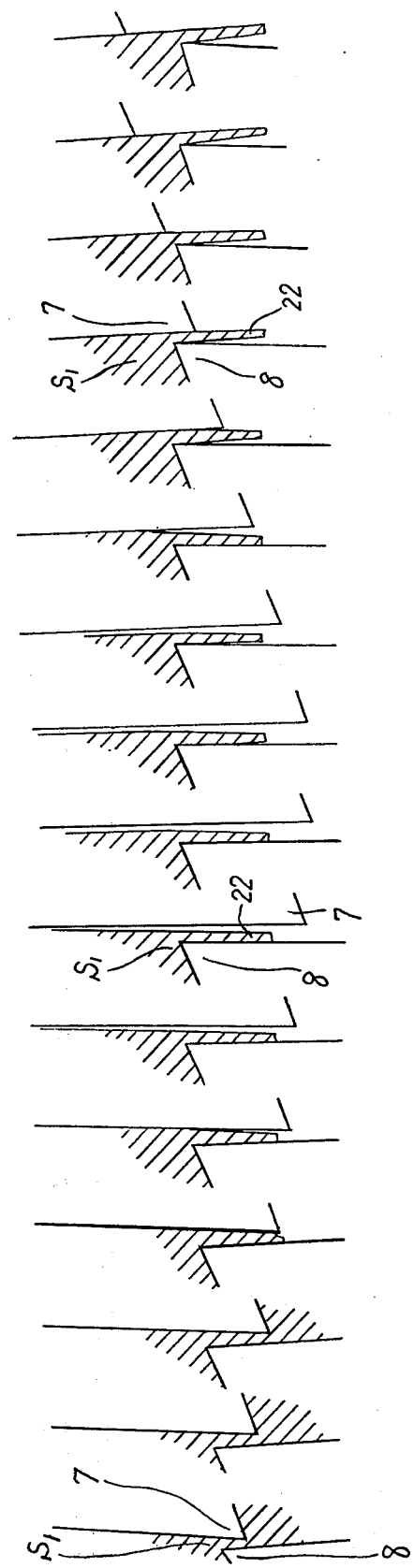
FIG. 11 shows steps of shearing a hot strip with a drum type flying shear in accordance with the present invention.
Figure 12:
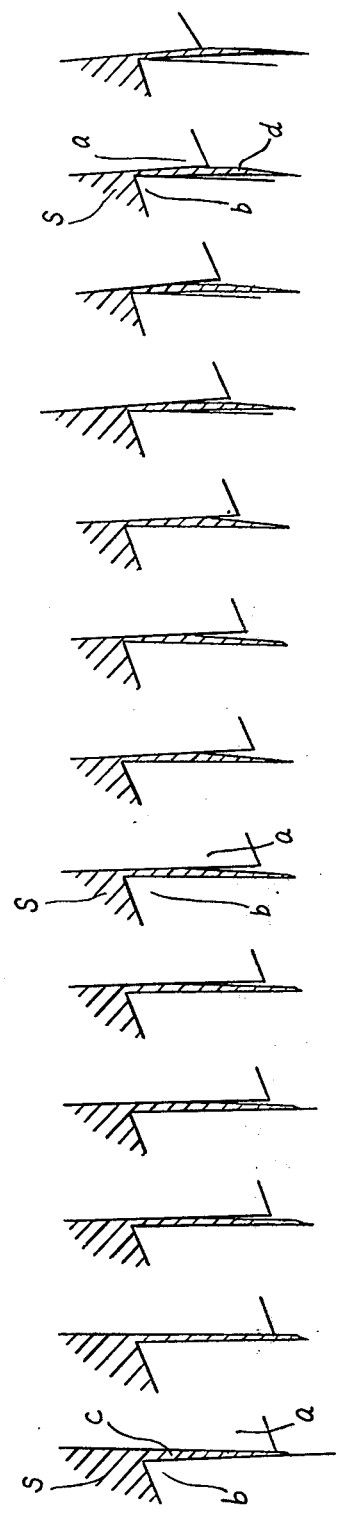
FIG. 12 shows steps of shearing a hot strip with a prior art drum type flying shear.

When the hot strip $S_1$ is sheared in the manner described in detail above, a shearing burr still occurs as indicated by 22 in FIG. 11, but since the upper bearing box 2 is caused to move in the direction in which the hot strip $S_1$ is moved as best shown in FIG. 2 and the lower blade 8 is also moved in the same direction and then downwardly, the gap between the upper and lower blades 7 and 8 may be prevented from being decreased excessively so that the shearing burr 22 may be prevented from being rolled again and consequently no needlelike burrs occur opposed to the conventional drum type flying shears.

Figure 3:
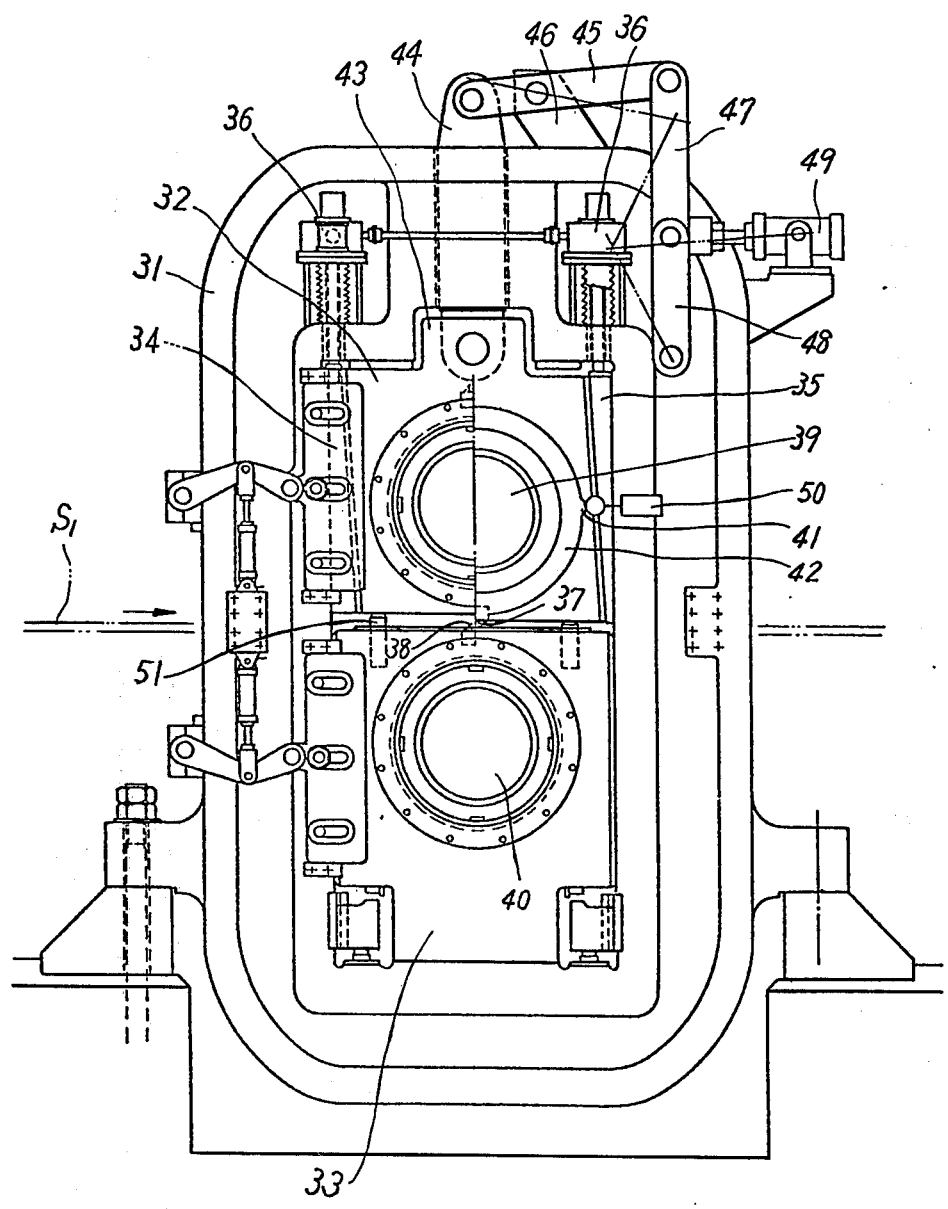
FIG. 3 is a front view of a second embodiment of the present invention.
Figure 4:
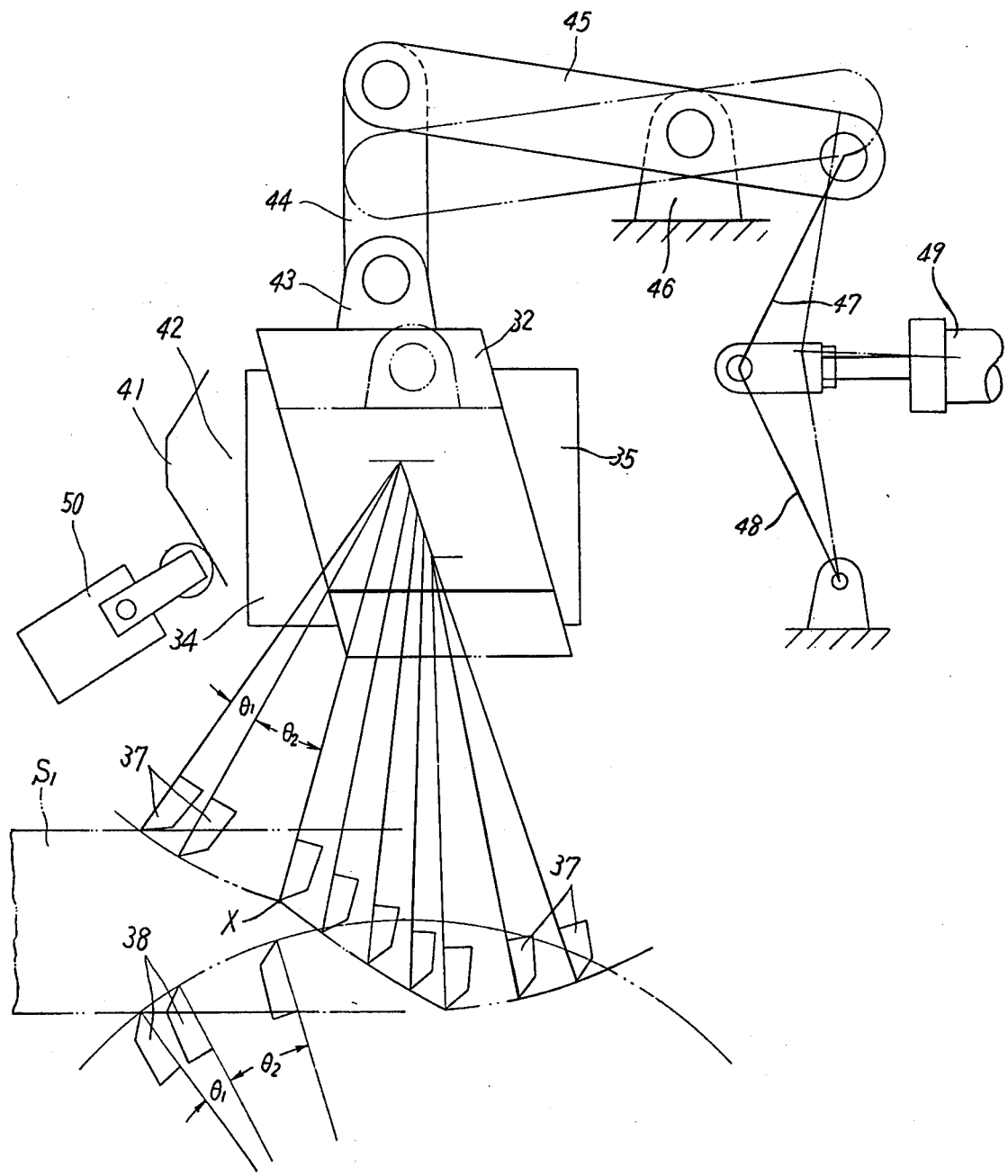
FIG. 4 is a view used for the explanation of the mode of operation thereof.

Second Embodiment, FIGS. 3 and 4

As in the first embodiment, a pair of housings 31 are erected and spaced apart from each other widthwise of the hot strip $S_1$ so that the strip $S_1$ may pass between the housings 31. A lower bearing box 33 having a bearing (not shown) is vertically movably mounted on the lower portion of the housing 1. Wedges 34 and 35 are slidably mounted on guide surfaces formed on the upper and inner portion of the housing 31 and are vertically movable by driving devices 36 in order to adjust their positions, and an upper bearing box 32 having a bearing (not shown) is vertically slidably fitted between the tapered surfaces of the wedges 34 and 35.

An upper drum 39 having an upper blade 37 is rotatably supported by the upper bearing boxes 32 while a lower drum 40 having a lower blade 38, between the lower bearing boxes 33. A cam plate 42 having a projection 41 extended from the periphery of the cam plate is rotatably carried by the shaft of the upper drum 39 for rotation in unison therewith as best shown in FIG. 4.

The lower end of a link 44 is pivoted to a bracket 43 firmly attached to the top of the upper bearing box 32 while the upper end is pivoted to one end of a lever 45 after extending through a hole formed through the top of the housing 31. The lever 45 has its point between the ends pivoted to a bracket 46 firmly attached to the top of the housing 31 and has its the other end pivoted to the upper end of an upper link 47 of a toggle mechanism which extends normally downwardly at an angle relative to the vertical as indicated by the solid line in FIG. 4. The lower end of the upper link 47 is pivoted to the free end of a rod of a hydraulic cylinder 49 mounted on the side wall of the housing 31 and to the upper end of a lower link 48 of the toggle mechanism. The lower end of the lower link 48 is pivoted to a bracket firmly attached to the side wall of the housing 31.

A sensor 50 such as a limit switch for detecting the angular position of the upper blade 37 has a roller made in contact with the cam plate 42, and a balance cylinder 51 is mounted on the lower bearing box 33 for raising the upper bearing box 32. Both the upper and lower drums 39 and 40 are drivingly coupled through upper and lower spindles (not shown) to a prime mover (not shown).

Next the mode of operation of the second embodiment with the above construction will be described. When the hot strip $S_1$ is fed into the drum type flying shear and reaches a predetermined position a sensor (not shown) outputs a signal in response to which the prime mover is energized to drive the upper and lower drums 39 and 40.

Upon rotation of the upper and lower drums 39 and 40 the upper and lower blades 37 and 38 draw circular loci or paths, starting the shearing of the hot strip $S_1$. The cam plate 42 carried by the upper drum 39 rotates in unison therewith, but the lever 45, the upper and lower links 47 and 48 and the piston rod of the hydraulic cylinder 49 remain stationary in the positions indicated by the solid lines in FIG. 4 so that the upper drum 39 is permitted to rotate but not permitted to move downward along the guide surfaces of the wedges 34 and 35.

The upper and lower blades 37 and 38 rotate through an angle $\theta_1$ and then through an angle $\theta_2$, drawing the circular loci and shearing the hot strip $S_1$. When the cutting edge of the upper blade 37 reaches a predetermined position X (See FIG. 4), the projection 41 of the cam plate 42 pushes the roller of the sensor 50 to actuate it. Then in response to the output signal from the sensor 50, a solenoid-operated valve (not shown) is so operated as to cause the hydraulic cylinder 49 to retract its rod. As a result, the upper and lower links 47 and 48 are forced to swing to the right in FIG. 4 to the position indicated by the two-dot chain lines so that the lever 45 is forced to rotate in the counterclockwise direction and consequently the upper bearing box 32 is forced downward along the tapered guide surfaces of the wedges 34 and 35. As a consequence the upper blade 37 is forced to move along a non-circular path as indicated by the two-dot chain lines in FIG. 4, whereby the hot strip $S_1$ can be completely sheared.

When the roller of the sensor 50 passes beyond the projection 41 of the cam plate 42, the solenoid-operated valve (not shown) is switched so that the hydraulic cylinder 49 is caused to extend its rod so that the upper and lower links 47 and 48 are caused to swing back to the left to the initial positions indicated by the solid lines in FIG. 4. As a result the lever 45 is forced to rotate in the clockwise direction so that the upper bearing box 32 is lifted upward 17 along the wedges 34 and 35 to the initial position and consequently the upper blade 37 draws a circular locus again. As with the first embodiment the lower blade 37 always draws a circular locus, and the downward and upward movement of the upper bearing box 32 is precisely controlled by the cam plate 42, the sensor 50, the hydraulic power cylinder 49 including the solenoid-operated control valve, the upper and lower links 47 and 48, the lever 45 and the link 44 so that the deviation of timing for coacting the upper and lower blades 37 and 38 for shearing the hot strip $S_1$ may be eliminated. Thus the reliable shearing may be attained. If the timing deviation should occur, it may be corrected by the adjustment of the position of the sensor 50.

However, as with the first embodiment shearing burrs cannot be prevented, but the upper bearing box 32 is moved toward the direction in which the hot strip $S_1$ is moved and the lower blade 38 is also moved in the direction in which the hot strip $S_1$ is moved and then downwardly so that the gap between the upper and lower blades 37 and 38 may be prevented from being excessively narrowed to roll the shearing burrs and consequently needle-shaped burrs may be eliminated.

Figure 5:
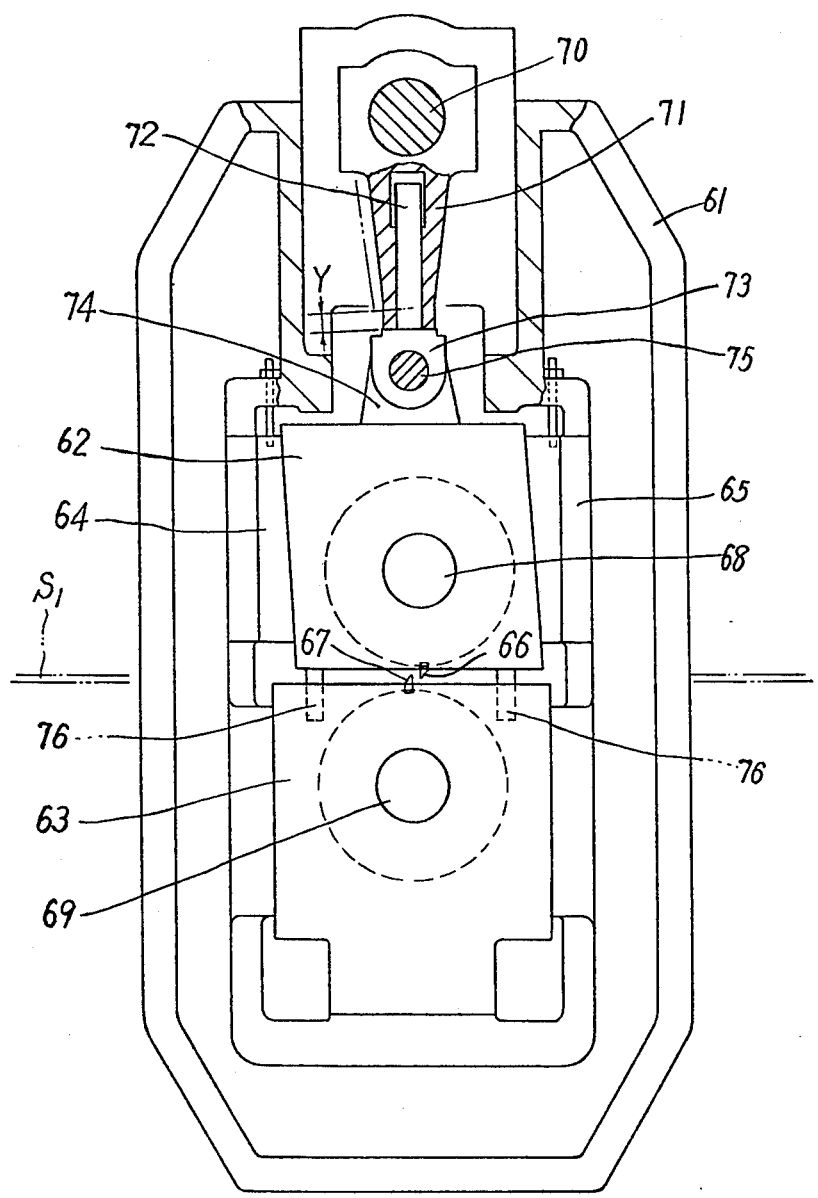
FIG. 5 is a front view of a third embodiment of the present invention.
Figure 6:
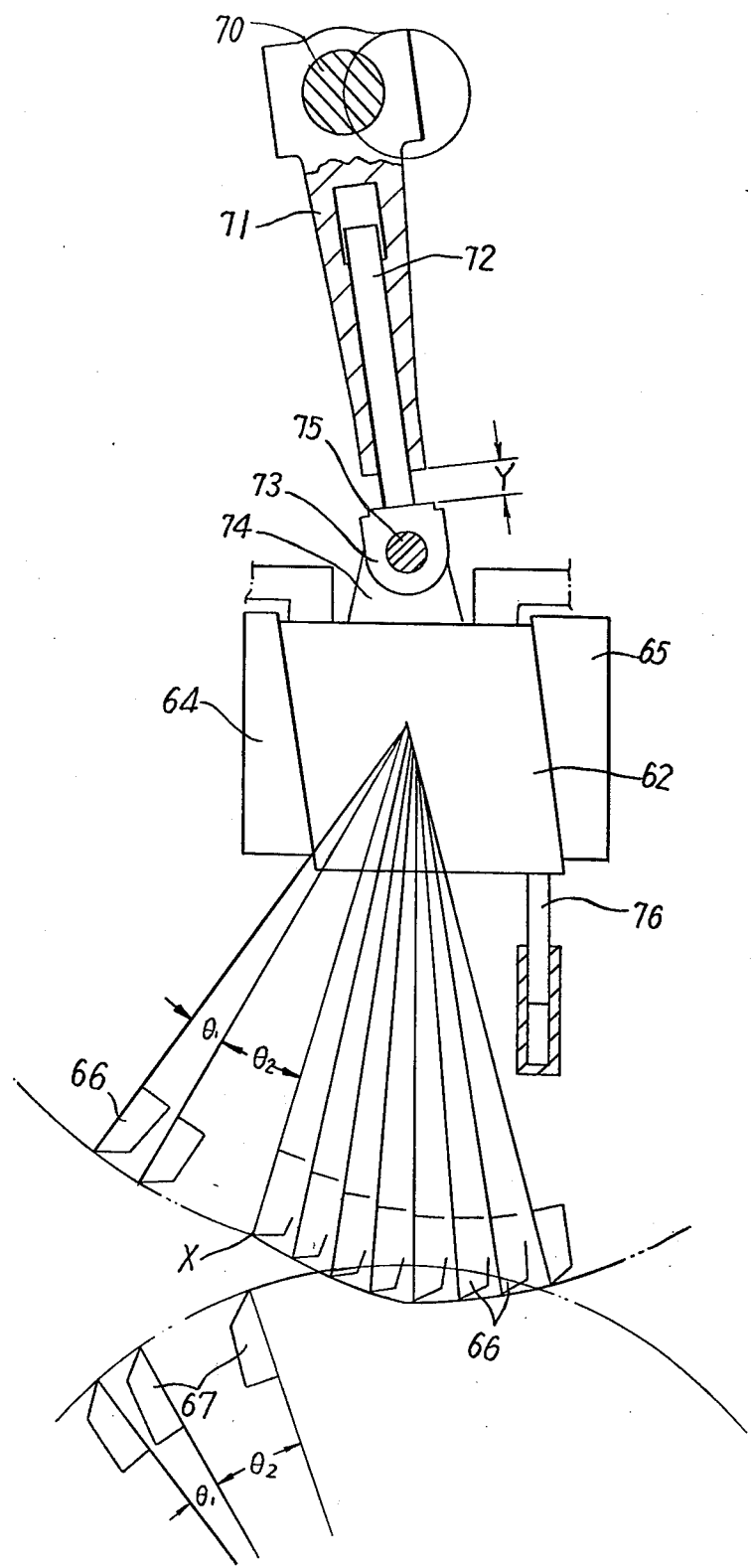
FIG. 6 is a view used for the explanation of the mode of operation thereof.

Third Embodiment, FIGS. 5 and 6

Referring to FIG. 5 a pair of housings 61 are erected on both sides of the passage of a hot strip $S_1$ in the manner substantially similar to that described above, and a lower bearing box 63 and a lower drum 69 with a lower blade 67 are mounted also in the manner substantially similar to that described above. An upper bearing box 62, wedges 64 and 65 and an upper drum 68 with an upper blade 66 are also mounted in the manner substantially similar to that described above.

Referring also to FIG. 6, a crankshaft 70 is rotatably supported by a bearing (not shown) which in turn is mounted on the top of the housing 61, and is drivingly coupled to a driving device or prime mover (not shown). A first connecting rod 71 is fitted over the throw or crankpin of the crankshaft 70 and a second connecting rod 72 is slidably fitted into an axial hole of the first connecting rod 71. A head 73 securely attached to the lower end of the second connecting rod 72 is pivoted with a pin 75 to a bracket 74 firmly attached on the top of the upper bearing box 62.

Balance cylinders 76 are mounted on the top of the lower bearing box 63 and their piston rods may be extended and pressed against the bottom of the upper bearing box 62 thereby supporting it. The upper frame and lower drums 68 and 69 are drivingly coupled through upper and lower spindles (not shown) to a driving device (not shown).

Prior to the initiation of shearing operation, the upper bearing box 62 is pushed upwardly by the balance cylinders 76 so that the top of the bearing box 62 is made into contact with a stopper extended from the housing 61 as shown in FIG. 6. The throw or crankpin of the crankshaft 70 is located above the axis of rotation of the latter so that the lower end of the first connecting rod 71 and the head 73 of the second connecting rod 72 is spaced apart from each other by a distance Y as shown in FIG. 6.

Next the mode of operation of the third embodiment with the above construction will be described. When the hot strip $S_1$ is fed into the flying shear and reaches a predetermined position, a sensor (not shown) outputs a signal in response to which the driving device (not shown) is energized to drive the upper and lower drums 68 and 69 and the crankshaft 70.

Upon rotation of the upper and lower drums 68 and 69 and the crankshaft 70, the upper and lower blades 66 and 67 rotate to shear the hot strip $S_1$ in the manner substantially similar to that described above, and the first connecting rod 71 is lowered. Since there is a gap Y between the lower end of the first connecting rod 71 and the head 73 of the second connecting rod 72 and there is also a gap greater than the gap Y between the bottom end of the axial hole of the first connecting rod 71 and the upper end of the second connecting rod 72, the latter is not caused to move downwardly and consequently the upper bearing box 62 is also not permitted to move downwardly. As a consequence both the upper and lower blades 66 and 67 draw circular loci, shearing the hot strip $S_1$.

After the rotation through the angles $\theta_1$ and $\theta_2$, the cutting edge of the upper blade 66 reaches the point X shown in FIG. 6. Then the lower end of the first connecting rod 71 is made into contact with the upper end of the head 73 of the second connecting rod 72 so that no gap exists therebetween. Then as the crankshaft 70 rotates, the first connecting rod 71 is lowered so that the second connecting rod 72 is forced to move downwardly. Consequently the upper bearing box 62 is forced to move downwardly along the tapered guide surfaces of the wedges 64 and 65 just in the same manner as in the first and second embodiments so that the upper blade 66 is spaced apart from the lower blade 67, drawing a non-circular locus, whereby the shearing of the hot strip $S_1$ is finished.

When the shearing is completed, the first and second connecting rods 71 and 72 are in line with the vertical line passing through the center of rotation of the crankshaft 70, but as the rotation of the crankshaft 70 continues the first connecting rod 71 is forced upward away from the upper end of the head 73 of the second connecting rod 72. As a result, the upper bearing box 62 is forced to move upwardly by the balance cylinders 76 along the tapered surfaces of the wedges 64 and 65 and is stopped when the top of the upper bearing box 62 is made into contact with the stopper 77. The crankshaft 70 continues rotation until its throw or crankpin returns to its initial position immediately above the axis of rotation of the crankshaft 70. Thus the flying shear is reset for the next shearing.

In the process of shearing, burrs are also produced as with the first and second embodiments, but as shown in FIG. 6 the upper bearing box 62 is caused to move in the direction in which the hot strip $S_1$ is moved while being lowered and the lower blade 67 is also rotated in the direction in which the strip $S_1$ is moved and then downwardly so that the gap between the upper and lower blades 66 and 67 may be prevented from being excessively decreased to cause the re-rolling of burrs. Therefore opposed to the prior art drum type flying shears, the needle-shaped burrs may be eliminated.

Fourth Embodiment, FIGS. 7 through 10

Figure 8:
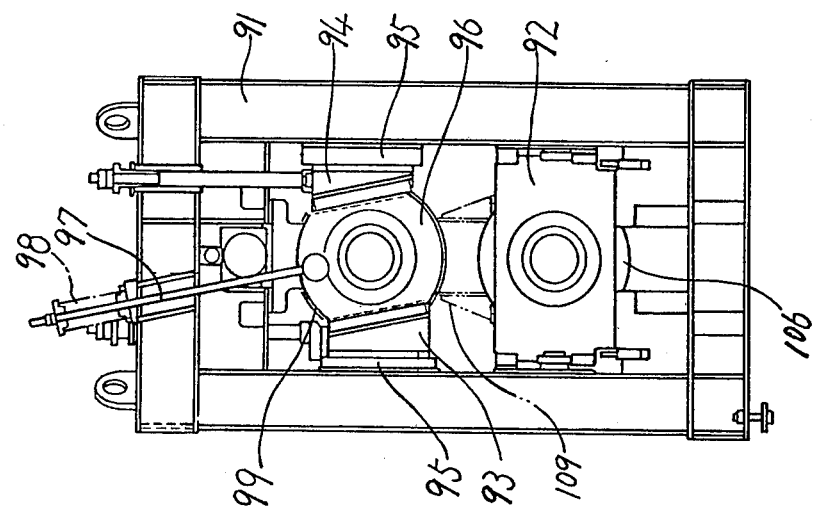
FIG. 8 is a side view thereof.

Since the construction of the left and right sides (See FIG. 7) of the fourth embodiment are substantially similar as with the first, second and third embodiments, only one side will be described. A lower bearing box 92 is mounted on the lower portion of a frame 91 in a manner substantially similar to that described above so that its position may be suitably adjusted. Wedges 93 and 94 are slidably mounted on guides 95 attached to the frames 91 in such a way that their inclined surfaces may be in parallel with each other as best shown in FIG. 8 and that their positions may be suitably adjusted as with the case of the above described embodiments. An upper bearing box 96 is slidably fitted between the inclined surfaces of the wedges 93 and 94 so that it may be upwardly and downwardly moved at an angle relative to the vertical. The lower end of a rod 97 is pivoted to the top of the upper bearing box 96 while the upper end portion is extended through the upper beam 91 as best shown in FIG. 8 and a coil spring 98 is loaded between the upper beam 91 and a spring stop firmly attached to the upper end of the rod 97 so that the upper bearing box 96 may be normally pulled upwardly.

Figure 7:
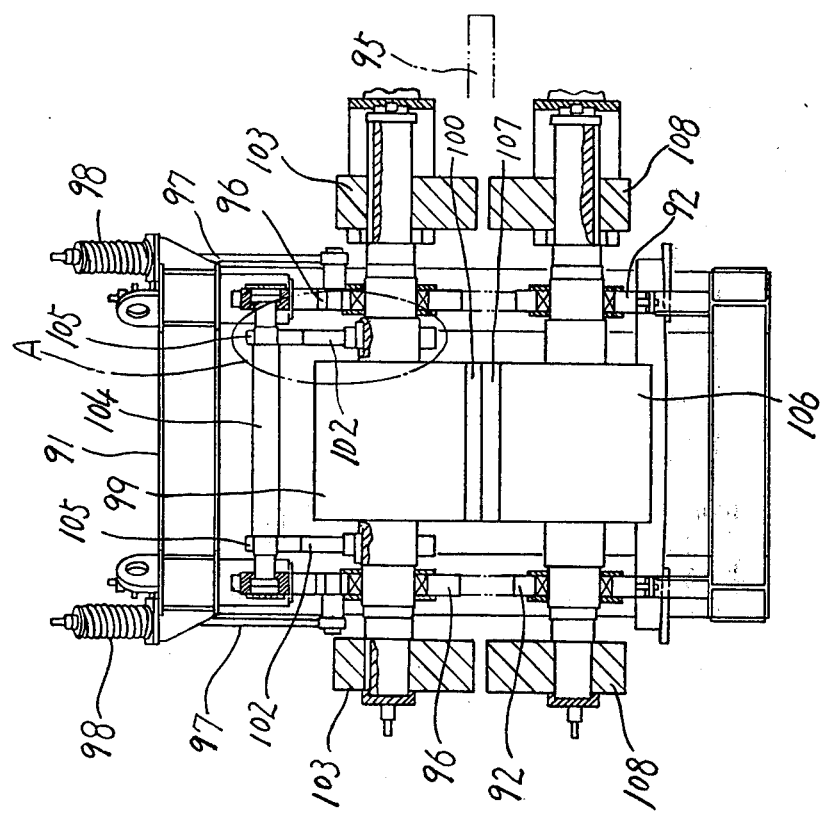
FIG. 7 is a front view, partly broken, of a fourth embodiment of the present invention.
Figure 10:
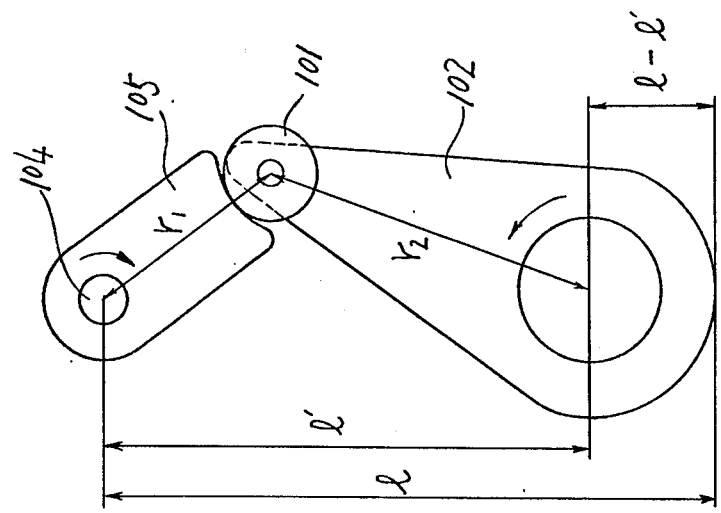
FIG. 10 is a side view thereof with a drum further rotated from the position shown in FIG. 9.
Figure 9:
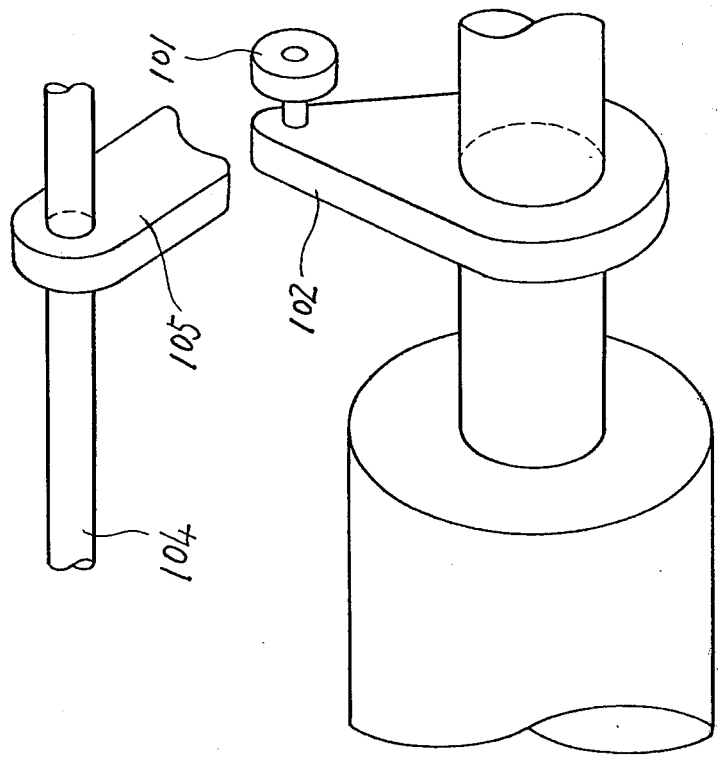
FIG. 9 is a perspective view, on enlarged scale, of a portion encircled by chain lines in FIG. 7.

An upper drum 99 with an upper blade 100 is rotatably supported by the upper bearing boxes 96, and one end of a teardrop-shaped link 102 is keyed to the shaft of the upper drum 99 at a position inside the frames 91 as best shown in FIG. 7, and a roller 101 is rotatably attached to the other end of the link 102 as best shown in FIGS. 9 and 10. A cam 103 is carried by the shaft of the upper drum 99 outside of the frames 91 as best shown in FIG. 7.

Referring particularly FIGS. 7, 9 and 10, a shaft 104 which is supported by the frames 91 extends in parallel with the axis of the upper drum 99 and is vertically upwardly spaced apart from the drum 99 by a suitable distance. A cam 105 is carried by the shaft 104 for engagement with the roller 101 of the link 102 and is normally extended downwardly at an angle relative to the vertical. Upon rotation of the upper drum 99 the link 102 also rotates in unison therewith an its roller 101 is made into engagement with the cam surface of the cam 105 as best shown in FIG. 10, and as the upper drum 99 continues rotation, the cam 105 which is in engagement with the roller 101 is caused to rotate in the direction indicated by the arrow in FIG. 10 so that the link 102 and hence the upper drum 99 are forced to move downwardly against the coil spring 98. That is, the upper bearing box 96 is forced to move downward along the inclined surfaces of the wedges 93 and 95, and the upper blade 100 attached on the upper drum 99 reaches the lowermost position when the cam 105 and the link 102 are in line with each other.

A lower drum 106 with a lower blade 107 is rotatably supported by the lower bearing boxes 92, and a cam 108 is carried by the shaft of the lower drun 106 at the outside of the frames 91 for engagement with the cam 103 carried by the shaft of the upper drum 99. The relative angular positions of the cams 103 and 108 are so selected that they may engage with each other when the upper blade 100 is slantly downwardly moved and is moved away from the lower blade 107 as will be described in more detail hereinafter.

One ends of the shafts of the upper and lower drums 99 and 106 are drivingly coupled to independent driving shafts, respectively, and a stool 109 is provided for facilitating the exchange of the upper and lower drums 99 and 106.

Next the mode of operation of the fourth embodiment with the above construction will be described. When the hot strip $S_1$ is fed into the flying shear and reaches a predetermined position, a sensor (not shown) outputs a signal in response to which the upper and lower drums 99 and 106 are driven. The upper bearing box 96 is held in the upper or initial position by the coil spring 98 and the roller 101 of the link 102 carried by the shaft of the upper drum 99 is still angularly spaced apart from the cam 105 carried by the shaft 104. Upon rotation of the upper and lower drums 99 and 106 the upper and lower blades 100 and 107 draw circular loci until the roller 101 engages with the cam 105 in the inclined position as best shown in FIG. 10 when the hot strip $S_1$ is almost sheared. As the upper drum 99 continues rotation, the cam 105 is caused to rotate together with the link 102 so that the upper drum 99 and hence the upper bearing box 96 are gradually forced to move downward along the inclined surfaces of the wedges 93 and 94 and immediately before the link 102 and the cam 105 are in line with each other the upper drum 99 and the upper bearing box 96 are suddenly moved downward over a large stroke. As the upper drum 99 is slantly lowered, the upper blade 100 which has been drawing a circular locus is further forced downward, drawing a non-circular locus. As a result, the upper blade 100 is spaced apart from the lower blade 107 so that the degree of overlapping between the upper and lower blades 100 and 107 and the gap therebetween may be increased, whereby the hot strip $S_1$ can be completely sheared. The gap between the upper and lower blades 100 and 107 tends to increase due to the reaction forces produced during shearing, but the cams 103 and 108 carried by the shafts of the upper and lower drums 99 and 106, respectively, engage with each other so that the further increase of the gap may be prevented and consequently the bending of the shafts may be prevented.

Referring particularly to FIG. 10, the downward stroke of the upper drum 99 is equal to $$1 - 1'$$

where $1 = r_1 + r_2$ $r_1 = $ the distance between the axis of rotation of the cam 105 and the axis of rotation of the roller 101 when the latter is made into contact with the former in the initial position;

$r_2 = $ the distance between the axis of rotation of the roller 101 and the axis of rotation of the link 102; and $1' = $ the distance between the axis of rotation of the cam 105 and the axis of rotation of the link 102 when the roller 101 is made into contact with the cam 105 in its initial position.

When the upper drum 99 rotates through an angle at which the hot strip $S_1$ is completely sheared, the roller 101 of the link 102 is released from the cam 105 so that the upper drum and bearing box 99 and; 96 are lifted buy the coil spring 98 at a fast speed along the inclined guide surfaces of the wedges 93 and 94 to their initial positions and consequently the upper blade 100 starts drawing a circular locus again.

As with the embodiments described above, shearing burrs are produced, but both the upper and lower blades 100 and 107 are moved in the same direction as the hot strip $S_1$ so that the gap between them may be prevented from being excessively reduced to re-roll the burrs. Therefore needle-shaped burrs may be eliminated.

So far the upper blade has been described as drawing a non-circular locus immediately before the hot strip is completely sheared, but it is understood that the lower blade may be so arranged as to draw a non-circular locus and that various modifications may be effected without departing the true spirit of the present invention.

The advantage of the drum type flying shears in accordance with the present invention may be summarized as follows: (I) Since the upper or lower blade draws a non-circular locus, the degree of lap may be increased as compared with the prior art drum type flying shears so that shearing of hot strips may be effected in a more reliable manner. (II) When the upper blade is spaced apart from the lower blade as a hot strip is sheared, the upper blade moves in the direction of the movement of the hot strip at a speed faster than when the upper blade draws a circular locus so that the force for separating the hot strip from a crop is greater than that obtained by the prior art drum type flying shears and consequently the fracture of the hot strip may be much facilitated during the shearing. (III) The gap between the upper and lower blades may be prevented from being excessively narrowed so that needle-shaped burrs may be completely eliminated and consequently the surface flaws of hot strips may be eliminated with the resultant improvement in quality and the damages to work rolls may be prevented. (IV) In the first and second embodiments, the cam mechanism is used to operate the toggle mechanism so that the upper drum is moved directly through the lever and link so that the accurate and reliable pressing may be attained even when it is started during the shearing. (V) According to the third embodiment the downward movement of the upper bearing box is caused intermittently by the rotation of the crankshaft so that the deviation of timing for pressing the upper blade is eliminated and consequently the positive and complete shearing can be attained. (VI) According to the fourth embodiment, the non-circular movement of the upper blade is automatically started as the link carried by the upper drum shaft engages with the cam carried by the shaft which may bring the cam back to the initial position after disengagement from the link so that the provision of a sensor or the like may be eliminated and consequently the construction may be made very simple with the resultant reduction in cost. (VII) According to the fourth embodiment, both the upper and lower drum shafts carry the cams which engage with each other when the hot strip is sheared so that the shafts may have sufficient rigidity.

What is claimed is:

1. In a drum type flying shear an improvement comprising guide means at each side of the flying shear for permitting the downward and upward movement of at least one of an upper bearing box carrying an upper drum having an upper blade and a lower bearing box carrying a lower drum having a lower blade and means for causing the downward and upward movement of either said upper bearing box or lower bearing box and wherein one end of a first connecting rod is attached to the throw or crankpin of a crankshaft, and a second connecting rod whose lower end is pivoted to said upper or lower bearing box is slidably fitted into an axial hole extended from the other end of said first connecting rod.

* * * * *